G. B. VAN WAGENEN.
PNEUMATIC TIRE.
APPLICATION FILED MAR. 18, 1913.

1,206,948.

Patented Dec. 5, 1916.

Witnesses:

Garrat B. Van Wagenen Inventor
By his Attorney

UNITED STATES PATENT OFFICE.

GARRAT B. VAN WAGENEN, OF ALSTEAD CENTER, NEW HAMPSHIRE.

PNEUMATIC TIRE.

1,206,948.

Specification of Letters Patent.

Patented Dec. 5, 1916.

Application filed March 18, 1913. Serial No. 755,169.

*To all whom it may concern:*

Be it known that I, GARRAT B. VAN WAGENEN, a citizen of the United States, and a resident of Alstead Center, State of New Hampshire, have invented certain new and useful Improvements in Pneumatic Tires, of which the following is a specification accompanied by drawings.

This invention relates to improvements in pneumatic tires, preferably constructed in the standard way, that is, built upon a core, layer upon layer and consolidated under pressure and vulcanized into one coherent mass.

One of the principal features of the invention consists in the construction of the carcass or body of the tire upon which a suitable cover and tread are usually superposed. The carcass is usually formed of cotton fabric and my invention is designed to improve upon such construction, produce a carcass of greater strength than heretofore, and increase the resiliency. The usual cotton fabric carcass is apt to become weakened by decomposition, resulting from the introduction of moisture and dirt through small cuts and punctures and an important object of my invention is to produce a tire having a carcass in which this weakening does not take place.

A further object of the invention is to increase the adhesion between the component parts of the tires.

My improved tire is illustrated in one of its preferred forms in the accompanying drawings, in which—

Figure 1:
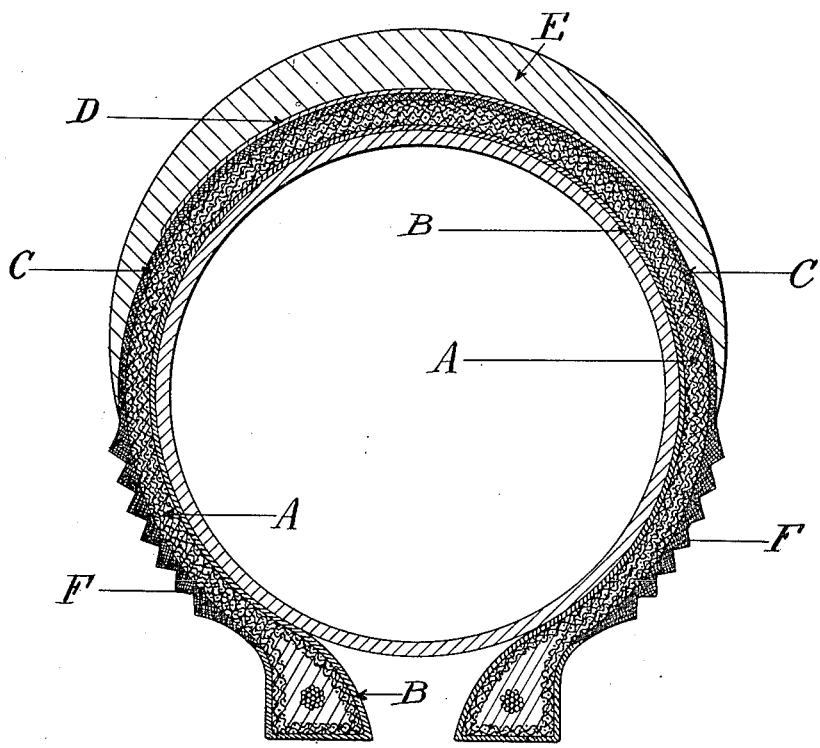
Figure 2:

Figure 1 is a transverse sectional view of a tire, and Fig. 2 is a detail plan view of a portion of one of the materials entering into the composition of the tire.

Referring to the drawings, A represents the carcass or body of the tire and in this instance I have shown a straight sided tire, by way of illustration, although the invention may be applied to a clencher tire or any other suitable tire. This carcass preferably consists of alternate layers of thin sheet rubber and woven wire cloth, and I have found that bronze wire cloth is probably the most suitable for carrying out the invention, since the adhesion of rubber to bronze wire is apparently greater than with other kinds of wire cloth and the granulation of the rubber occurring in the tire in actual use is reduced to a minimum.

In forming the carcass, any desired number of layers or plies of wire cloth may be used and I have found that at least four layers is a satisfactory number. The wire cloth is preferably cut on the bias, so that the wires run diagonally across the tire, since this construction affords greater freedom of movement in the wire mesh for expansion and contraction. These layers of sheet rubber and wire cloth are pressed together in the process of manufacture, so that all the interstices of the wire cloth are filled with rubber and after vulcanization, the layers become practically one concrete or coherent mass of rubber with the wire cloth embedded therein. The layers of rubber when formed into the concrete mass thus interlock and lock the wire cloth in place.

The advantages of this improved carcass over the cotton fabric carcass, reside in its greater strength; freedom from decomposition, because the introduction of moisture and dirt through small cuts and punctures will not rot the carcass and weaken it, as in the case of a cotton fabric; greater resiliency, resulting from the fact that the carcass may be made thinner than the fabric carcass, owing to its greater strength, with the result that the air space within the shoe is larger; and lastly, the adhesion of the component parts of the tire is made greater by means of the construction of my improved carcass.

The remaining plies or layers of the tire may be constructed and combined in different ways, but the construction illustrated in the drawings is suitable and produces an efficient tire. The first or inner layer B may consist of a fabric preferably closely woven and preferably composed of asbestos and a small percentage of cotton to give the required tensile strength. This layer B is intended as an insulation to protect the air in the inner tube from the heat generated by the tire in action, and also provides a surface to which powdered soap-stone or flake graphite may be applied to prevent undue friction between the tube and the casing. This fabric B is preferably impregnated with rubber.

The carcass or body as shown is placed next to the inner layer B. Over the carcass and preferably upon the last or outer layer of wire cloth may be placed a rubber cover C preferably of Congo rubber, and preferably extending entirely around the shoe surface of the cascass. This rubber cover C may, if desired, be reinforced or thickened from the point at each side where the shoe surface comes in contact with the rim to the points where the tread E begins, and said extra thickness of rubber may be provided with corrugations F as shown. These corrugations F are intended to cool the tire in action and radiate as much heat as possible.

An insulating breaker strip D is preferably provided between the rubber cover C and the tread E. This breaker strip may be formed of loosely woven cotton and asbestos fabric preferably impregnated with rubber and is intended to insulate the carcass of the tire as much as possible from the heat generated by road friction and also fulfils the usual functions of such breaker strips. The tread E is of the usual form in this instance and is preferably applied in the mold.

The entire construction built up of the layers of materials substantially as described and consolidated under pressure and vulcanized into one coherent mass forms a highly efficient pneumatic tire.

I claim and desire to obtain by Letters Patent the following:

A pneumatic tire, comprising an inner heat insulating layer of closely woven asbestos fabric containing a small percentage of cotton and impregnated with rubber, a carcass formed of a plurality of alternate layers of woven bronze wire cloth cut on the bias, and layers of sheet rubber vulcanized into one coherent mass under pressure, whereby the vulcanized rubber fills the interstices of the wire cloth and locks the whole mass together, a cover of rubber extending entirely around the outer surface of the carcass, a tread, and a heat insulating breaker strip formed of loosely woven cotton and asbestos fabric impregnated with rubber arranged between the central portion of the tread and the rubber cover, the ends of the rubber cover extending beyond the tread.

In testimony whereof I have signed this specification in the presence of two subscribing witnesses.

GARRAT B. VAN WAGENEN.

Witnesses:
    THOS. H. MOORE,
    C. J. NEWELL.